United States Patent [19]

Beasley

[11] 4,387,954

[45] Jun. 14, 1983

[54] METHOD FOR FABRICATING AN OPTICAL WAVEGUIDE EVANESCENT WAVE COUPLER HAVING AN INTERLEAVED FILM

[75] Inventor: J. Donald Beasley, Arlington Heights, Ill.

[73] Assignee: Gould Inc., Rolling Meadows, Ill.

[21] Appl. No.: 225,893

[22] Filed: Jan. 19, 1981

[51] Int. Cl.³ ............................................. G02B 5/14
[52] U.S. Cl. ................................. 350/96.15; 350/96.29
[58] Field of Search ........................... 350/96.15, 96.29

[56] References Cited

U.S. PATENT DOCUMENTS

| | | |
|---|---|---|
| 3,408,131 | 10/1968 | Kapany . |
| 4,021,097 | 5/1977 | McMahon . |
| 4,053,204 | 10/1977 | Miller . |
| 4,054,366 | 10/1977 | Barnoski et al. . |
| 4,086,484 | 4/1978 | Steensma . |
| 4,113,345 | 9/1978 | Gerndt . |
| 4,128,301 | 12/1978 | Burns et al. . |
| 4,135,779 | 1/1979 | Hudson ................ 350/96.15 |
| 4,136,929 | 1/1979 | Suzaki . |
| 4,182,935 | 1/1980 | Chown . |

FOREIGN PATENT DOCUMENTS

| | | | |
|---|---|---|---|
| 54-4153 | 1/1979 | Japan | ................. 350/96.15 |
| 54-118255 | 9/1979 | Japan | ................. 350/96.15 |

OTHER PUBLICATIONS

Auracker et al., *New Directional Coupler for Integrated Optics*, Jrnl. of Applied Physics, vol. 45, No. 11, Nov. 1974, pp. 4997-4999.
U.S. Ser. No. 106,762; filed 12/26/79; Stowe et al.
U.S. Ser. No. 106,763; filed 12/26/79; Stowe et al.

*Primary Examiner*—Paul L. Gensler
*Attorney, Agent, or Firm*—K. H. Pierce; John R. Garrett; Edward E. Sachs

[57] ABSTRACT

A method and an apparatus is disclosed for making an evanescent wave coupler. Two optical waveguides have a portion of the cladding material removed until the core is exposed. The two optical waveguides are placed in juxtaposition with an interleaf film between them. The interleaf film insures an accurate and constant spatial relation between the two optical waveguides to have reliable evanescent coupling therebetween.

1 Claim, 5 Drawing Figures

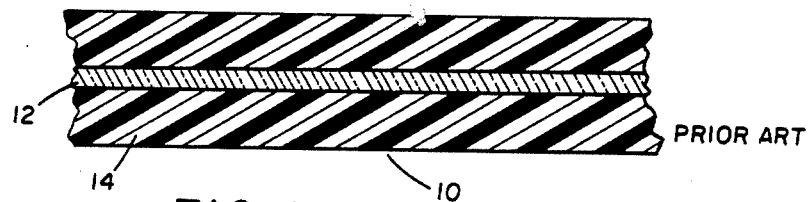
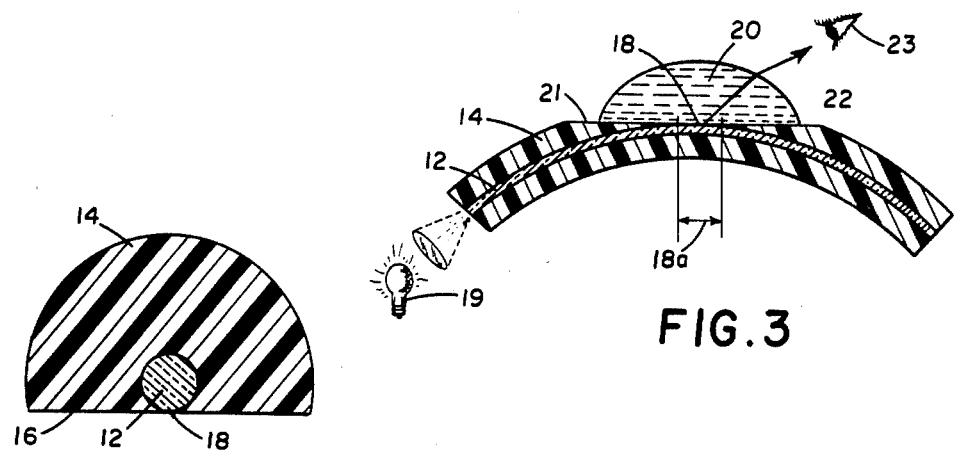
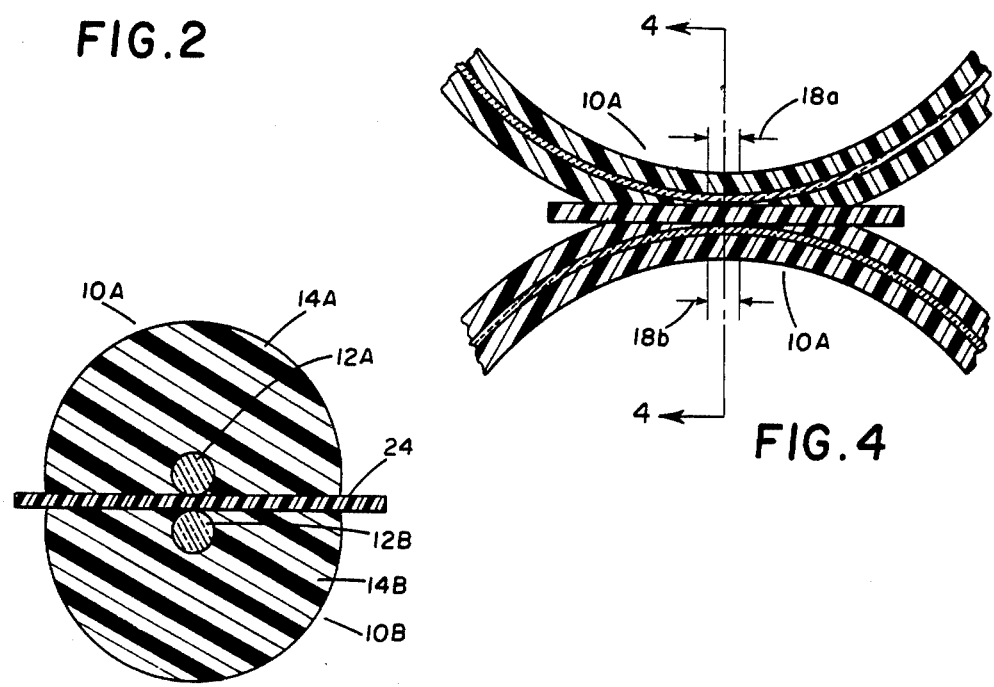

METHOD FOR FABRICATING AN OPTICAL WAVEGUIDE EVANESCENT WAVE COUPLER HAVING AN INTERLEAVED FILM

BACKGROUND OF THE INVENTION

The present invention relates to an optical wave coupler and is more particularly directed to an evanescent wave coupler that uses an interleaved film.

It is known in the art to fabricate optical wave couplers particularly applicable to fiber optics. Such devices typically involve removal of the cladding material from two optical fibers by acid etching in a solution of hydrofluoric acid, or by the use of abrasive papers or pastes. The cladding is removed until about one micrometer of cladding remains over each of the fiber optic cores. The fibers prepared in such a manner are then placed in optical contact with their etched or ground surfaces touching. Such assemblies position the fiber optic cores within about one to three micrometers apart. This distance is close enough to permit coupling of optical energy from one fiber core to the other.

The difficulties with acid etching or abrasively wearing away the cladding material surrounding the fiber cores is the ability to know when to stop the etching or abrasion process since the location of the core only becomes evident after the removal process has penetrated the core. If the core is reached, evanescent coupling is not possible by the above described prior art fabrication techniques.

A need has been felt to achieve consistent evanescent coupling fabrication. The amount of coupling between the two fibers is a function of the distance between the two fiber cores. If an assembly could be built which would yield consistent evanescent coupling assemblies such devices could be used for pressure sensing systems, e.g., microphones, hydrophones, transducers, etc.

OBJECTS OF THE INVENTION

An object of the present invention is to provide a method and an assembly which will yield more consistent evanescent coupling systems than has heretofore been possible.

Another object of the present invention is to provide evanescent wave couplers that would be useful in pressure sensing systems.

The above objects are given by way of example. Thus other desirable objectives and advantages achieved by the invention may occur to those skilled in the art. The scope of the invention is to be limited only by the appended claims.

BRIEF SUMMARY OF THE INVENTION

The above objects and other advantages are achieved by the present invention. A method and an apparatus are provided which will generate consistent evanescent coupling assemblies between two fiber optic cores. Two optical fibers of the type having a cladding material surrounding a core have the cores illuminated and then the cladding materials are abraded, etched or polished until the cladding material of each of the fiber optic waveguides is removed to the point at which the optical core has been reached. The removal area forms a coupling region. The end point of removal is discerned by noting the increase in scattered light from the illuminated core. The two cores are then placed together along the coupling region with an intervening film of a specified thickness therebetween such that the two cores have a consistent spatial relationship. Such a configuration provides for consistent evanescent coupling between the two cores since the space relationship of the assembly will always be the same. It is desirable to have the intervening film be of the same substance or the same optical index as the cladding materials of the two optical waveguides.

Since the invention provides for consistent evanescent coupling spacing between the optic cores, a pressure sensitive device is feasible. If pressure is applied to one of the optical fibers along the coupling region, the intervening film will compress, thus affecting the spatial relation between the two fiber cores, thus changing in the evanescent coupling therebetween which can be detected in one of the wavegides.

DESCRIPTION OF THE DRAWINGS

FIG. 1 is a cross-section of a typical optical fiber;

FIG. 2 is an end view of a single fiber whose cladding has been removed to expose the fiber optic core;

FIG. 3 is a side view schematic of the method for removing the cladding from one optical fiber;

FIG. 4 is a side view of the assembly of the present invention; and

FIG. 5 is an end view along lines 4—4 of FIG. 3 of the present invention showing the coupling assembly.

DESCRIPTION OF THE PREFERRED EMBODIMENTS

A description of the invention follows, referring to the drawings in which like reference numerals denote like elements of structure in each of the several figures.

In general the terms "optical waveguide" or "optical fibers" will be used herein to refer to a glass transmission line having a core member with a cladding member concentrically surrounding the core for transmission by internal reflection at the core-cladding interface of electromagnetic radiation which lies in the optical portion of the electromagnetic spectrum between microwaves and x-rays and including the ultraviolet, visible and infrared regions.

There is shown in FIG. 1 a representation of a typical single fiber optic waveguide 10 which has a core 12 which is concentrically surrounded by a cladding 14. The index of refraction of the core material is greater than the index of refraction of the cladding material so that total internal reflection occurs at the core-cladding boundary. Operation of fiber optic waveguides are well known in the art and therefore will not be discussed in detail herein.

There is shown in FIG. 2 a typical waveguide such as shown in FIG. 1 in which a portion of a cladding material 14 has been removed forming a surface 16. There are several techniques known in the art for removing the cladding material 14 such as acid etching in solution of hydrofluoric acid or by use of abrasive papers or pastes. The present invention contemplates removal of a cladding 14 along surface 16 until the surface boundary 18 between the core 12 and cladding 14 is reached. The method for detecting when boundary 18 is reached, as is shown in FIG. 3, is to transmit light 19 through core 12 as the cladding material 14 is being removed. Reaching boundary 18 will be detected or identified by noting an increase in scattered light from the illuminated core. This is accomplished by use of optical medium 20 which has an optical index equal to or greater than that of core 12. The optical medium 20 is placed against surface 21 so that when removal of cladding 14 has exposed core 12 at the place of interest, light 22 is transferred into medium 20 and then to optical detector 23. Since medium 20 has the same or greater optical index as that of core 12, total internal reflection inside the core 12 does not occur when core 12 is directly in contact with medium 20. Even with a thin layer of cladding 14 remaining, some light will be coupled into medium 20 by virtue of evanescent wave coupling across the remaining thin layer. The gradual onset of illumination by light 22 as core 12 is approached allows accurate control over the removal of cladding 14. At this point the removal process is stopped. The removal process is repeated on another fiber optic waveguide for which it is desired to have optical coupling. The linear region of removed cladding defines a coupling region 18a.

The optical medium 20 may consist of a droplet of fluid whose outside surface is oriented so that light 22 is refracted toward detector 23. Medium 20 may also be a prism having the same or larger optical index as that of core 12. The prism would be optically contacted to the surface with an index matching fluid equal to that of the prism.

Turning now to FIGS. 4 and 5, the coupling assembly of the present invention can be better appreciated. Two fiber optic waveguides 10a and 10b have a portion of their cladding materials 14a and 14b removed in the same manner as described above to expose coupling regions 18a and 18b respectively. In order to achieve consistent evanescent wave coupling between the two fiber optics, an interleaved film 24 of a specified thickness is used. The coupling regions 18a and 18b of the two optical waveguides 10a and 10b are placed in juxtaposition with the interleaved film 24 therebetween. It is preferred that the film 24 be made of the same material as the cladding material 14a and 14b or that the optical index of film 24 be the same as that of the claddings 14a and 14b. One contemplated material that can be used for the interleaved film is nitrocelulose. Any optical material may be used for interleaved film 24 as long as its optical index is less than that of cores 12a and 12b. The thickness of the film is determined by the amount of evanescent coupling desired.

By using this invention a consistent evanescent wave coupler is achieved since the spatial relation between cores 12a and 12b will be the same in each wave coupler fabricated.

It is extremely desirable to have consistent evanescent wave couplers such as described above in that they may be used as pressure sensing devices or related devices such as microphones. The amount of evanescent coupling will depend upon the spatial relationship between the two fiber optic waveguide cores 12a and 12b. Once the coupler is fabricated any pressure in the perpendicular plane to the interleaved film will compress the film and subsequently change the spatial relationship between the two fiber optic cores. This change in spatial relationship due to the elastomeric properties of the interleaved film will cause a change in the evanescent wave coupling which can be detected through one of the fiber optic waveguides.

This invention has been described with reference to preferred embodiments. Obvious modifications and alterations will occur to others upon reading and understanding this specification. The intention is to include all such modifications and alterations insofar as they come within the scope of the appended claims or the equivalent thereof.

I claim:
1. A method for fabricating an optical waveguide evanescent wave coupler, from optical waveguides of the type having a core concentrically surrounded by a cladding material, said method comprising the steps of:
  a. transmitting optical energy through the core of a first optical waveguide thus illuminating the core;
  b. removing a portion of the cladding from said first optical waveguide;
  c. detecting when there is an increase in scattered light from the illuminated core of said first optical waveguide;
  d. stopping the removal of the cladding material when said increase in scattered light is detected;
  e. performing the steps of transmitting, removing, detecting and stopping for a second optical waveguide;
  f. placing said first and said second optical waveguides with the removed cladding surfaces in juxtaposition with an interleaf of material between said first and said second optical waveguides such that evanescent wave coupling occurs.

* * * * *

UNITED STATES PATENT AND TRADEMARK OFFICE
CERTIFICATE OF CORRECTION

PATENT NO. : 4,387,954
DATED : June 14, 1983
INVENTOR(S) : J. Donald Beasley

It is certified that error appears in the above-identified patent and that said Letters Patent are hereby corrected as shown below:

In column 2, line 56, after "in" please add -- a --.

In column 3, line 26, please delete "10 b" and insert therefor -- 10b --.

In column 3, line 39, please delete "nitrocelulose" and insert therefor -- nitrocellulose --.

Signed and Sealed this

Third Day of January 1984

[SEAL]

Attest:

GERALD J. MOSSINGHOFF

Attesting Officer

Commissioner of Patents and Trademarks